United States Patent Office 3,476,181
Patented Nov. 4, 1969

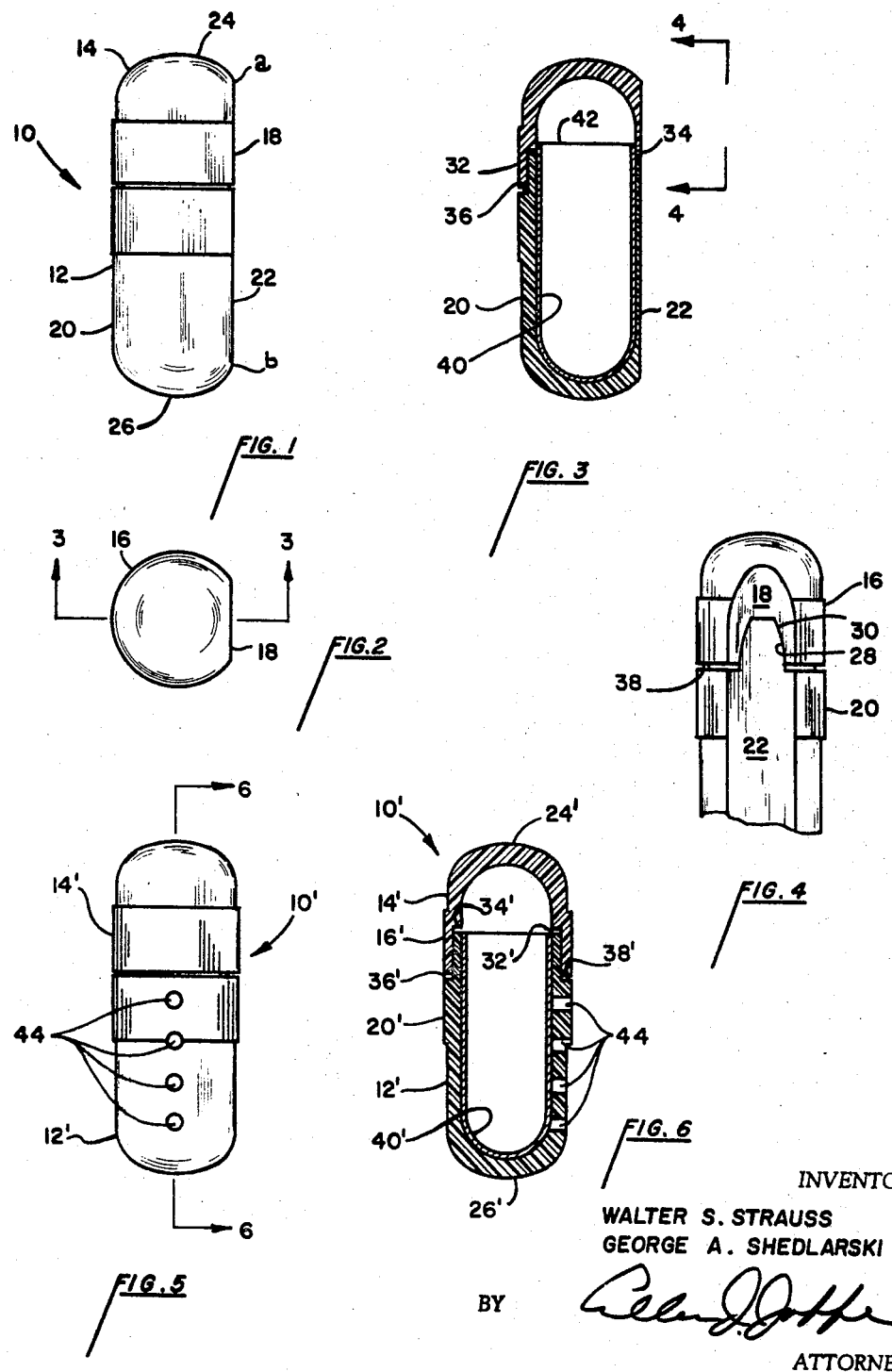

3,476,181
DENTAL INGREDIENT CAPSULE
Walter S. Strauss and George A. Shedlarski, Buffalo, N.Y., assignors to Dentek, Inc., Buffalo, N.Y., a corporation of New York
Filed Nov. 24, 1967, Ser. No. 685,692
Int. Cl. F28f *13/00;* A61k *5/00;* B01f *9/00*
U.S. Cl. 165—186                                   10 Claims

ABSTRACT OF THE DISCLOSURE

A dental ingredient capsule for use in a mixing machine of the type that sprays a coolant to a surface of the capsule wherein the surface facing the coolant spray nozzle is either flattened to provide a thin-walled section or apertured such that the thermal conductivity thereof is substantially greater than that of the remainder of the capsule.

BACKGROUND OF THE INVENTION

Heretofore the only successful methods of preparing the popular dental cements, such as the zinc phosphates or the silicates involved the use of manual spatulation techniques; according to which, the liquid and powder constituents are mixed by a spatula until a consistency is obtained that is judged to be proper by the visual perception of the operator. The resultant consistency may be satisfactory or not depending upon the skill and experience of the operator. In addition to the initial powder to liquid ratio, the consistency of the cement depends on such other variables as time, temperature and manner of manipulation. It is therefore not enough to utilize a previously established powder to liquid ratio if the other variables are not suitably controlled. With existing spatulation techniques such predetermined ratios function as guides only; the actual final consistency being dependent upon the skill and judgment of the operator.

Although motor actuated mechanical mixers, called amalgamators, have been used to prepare dental amalgams, attempts to employ such mixers for the dental cements have resulted in failure. This has been due primarily to the inability of the amalgamators to dissipate the great heat that is generated by the reacting constituents. In United States application for Letters Patent Serial Number 633,598, filed April 25, 1967, and assigned to the assignee of the present application, there is disclosed and described a dental cement mixing apparatus that overcomes the foregoing difficulties, by the provision, inter alia, of means to supply a coolant spray to a capsule, containing the powder and liquid constituents, while it is oscillating; whereby the heat generated by the reactants is effectively dissipated and premature hardening is eliminated.

SUMMARY OF THE INVENTION

The present invention relates to capsules and, more particularly, to capsules for holding the ingredients of dental materials, such as cement. More specifically, the present invention relates to a capsule that is especially adapted to be used in conjunction with the type of mixing apparatus disclosed in aforementioned application Number 633,598.

According to the present invention a capsule that is adapted to contain the constituents of dental cement or the like is characterized by the provision of means for allowing the heat of the reacting ingredients to be effectively dissipated at a high heat transfer rate, while at the same time insulating the reactants from the heat of the environment, and more particularly the heat from the fingers of one who handles the capsule after it and its ingredients are cooled.

Basically, the present invention provides; a dental ingredient containing capsule of the type that is adapted to be placed in a mixing machine that sprays a coolant fluid thereat, comprising; a body section; a telescoping cover section; and means on a portion of the sections and extending generally longitudinally thereof to substantially increase the thermal conductivity of the portion of the sections relative to the remaining portions of the sections.

According to one embodiment of the present invention the means to reduce the thermal conductivity comprises a flat surface extending from end to end of an otherwise cylindrical capsule having generally convex ends, to thereby define an extremely thinned wall section.

According to a second embodiment of the invention the aforementioned means to reduce the thermal conductivity comprises a plurality of longitudinally extending apertures placing the interior of the capsule in communication with the exterior thereof.

BRIEF DESCRIPTION OF THE DRAWINGS

For a more fuller understanding of the invention reference should now be had to the following detailed description thereof taken in conjunction with the accompanying drawings wherein;

FIGURE 1 is a front elevational view of one embodiment of the capsule according to the invention;

FIGURE 2 is a plan view of the capsule shown in FIG. 1;

FIGURE 3 is a sectional view of the capsule of FIG. 2 taken along line 3—3 thereof;

FIGURE 4 is a fragmentary view looking along line 4—4 of FIG. 3;

FIGURE 5 is a front elevational view of a second embodiment of the capsule according to the invention; and FIGURE 6 is a sectional view taken along line 6—6 of FIG. 5.

DESCRIPTION OF THE PREFERRED EMBODIMENTS OF THE INVENTION

Referring to the drawings and, more particularly, to the embodiment illustrated in FIGS. 1–4, the dental cement containing capsule is generally depicted at 10 and comprises a body section 12 and a telescoping cover section 14, fabricated from any suitable plastic material such as "Delran" or styrene, for example.

The exterior surface of cover section 14 is defined by a generally cylindrical side wall 16 with a portion of the surface thereof removed defining a flat side wall 18. Similarly, the exterior surface of body section 12 is defined by a generally cylindrical side wall 20 with a portion of the surface thereof removed defining a flat side wall 22. The opposite ends 24 and 26 of members 12 and 14 are generally convex as shown.

As seen in FIG. 4, flat surface 18 has a centrally located U-shaped opening 28 that is adapted to mate with a complementary shaped projection 30 on flat surface 22 of body section 12. Thus, when the two sections of capsule 10 are mating, the exterior shape thereof is defined by a flat surface extending from end to end of an otherwise generally cylindrical member having convex ends. This construction can be simply achieved by machining or otherwise removing the material between points *a* and *b* (FIG. 1) of a completely cylindrical capsule. As will become apparent hereinbelow the flat surfaces 18 and 22 define a longitudinally extending extremely thin walled section of the capsule to greatly increase the thermal conductivity of this section of the capsule relative to the remainder of the capsule, which due to the relatively thick walls thereof functions as an insulator.

Interiorly of capsule 10 cover section 14 contains an annular ledge 32 functioning as a stop for an opposed annular surface 34 of body section 12. Outwardly spaced from the foregoing surfaces a ledge 36 of section 12 coacts with an opposing surface 38 of cover 14 to limit movement thereof.

A metal insert or inner capsule 40 is securely mounted as by press-fitting interiorly of body section 12. Metallic insert 40 is very thin walled as shown, and has a top edge 42 that extends beyond the joinder of surfaces 32 and 34 to seal the contents therof against leakage at this joinder. Insert 40 may be fabricated from any suitable metal such as aluminum, for example.

The capsule 10 may be supplied with the powder ingredient prepackaged therein. In which case, the operator would add the required amount of the liquid constituent. If dental cement is to be mixed the powder ingredient might typically comprise fused $SiO_2$, $Al_2O_3$, $CaO$, metal phosphates and metal fluorides; whereas the liquid constituent usually consists predominantly of a water solution of $H_3PO_4$.

In operation, after the liquid constituent is placed in the capsule, the capsule is adapted to be placed in the capsule holder of the type of mixiing machine disclosed in the aforementioned application 633,598, wherein a coolant spray nozzle (element 98 in 633,598) is adapted to supply a coolant such as Freon to a surface of the capsule to dissipate the heat generated by reacting ingredients as the capsule is oscillated. The capsule 10 of the present invention is adapted to be placed in the capsule holder in such a manner that the flat surfaces 18 and 22, defining the thin-walled section, are directly facing the spray nozzle such that the bulk of the coolant material makes contact with the capsule along the flat surfaces.

Since the thin-walled section of the flat surfaces 18 and 22 has a greater thermal conductivity than the remainder of the capsule, the heat of the reactants within the capsule is dissipated at a much greater rate to thereby greatly increase the cooling and lower the temperature within the capsule. In addition, since the metal insert 40 is a greater conductor of heat than the plastic material of the capsule its temperature will remain below the temperature of the plastic. This will allow the temperature within the insert to remain at a low value for a relatively longer period of time, and further ensure against premature hardening of the cement.

When the capsule is removed from the mixing machine it is handled by the cylindrical side walls 16 and 20 thereof. The handling of the capsule by the thick-walled portions thereof will retard the flow of heat from the hands of the operator to the interior of the capsule. Thus, the cylindrical thick walls 16 and 20 of the capsule function as insulators for the interior of the capsule from the outer environment, after the preparation of the cement is completed and the capsule is removed from the machine.

In the embodiment illustrated in FIGS. 5 and 6 like numerals with primes refer to like parts of the previously described embodiment. In this embodiment the capsule 10' is completely cylindrical with convex ends 24' and 26'. Instead of the thin-walled flat surfaces of the previous embodiment the means for reducing the thermal conductivity is defined by a plurality of longitudinally extending apertures 44 in body section 12', which communicate the exterior of the capsule with the interior thereof. When placed in the mixing machine the line of apertures is placed directly facing the coolant supply nozzle, whereby the coolant material is allowed to come into direct contact with the metal insert 40' to achieve the same cooling effect as previously described with regard to the FIGS. 1–4 embodiment.

Although the apertures 44 are illustrated as contained within the body section 12', additional apertures may be placed in the cover section 14' if desirable. Moreover, the apertures need not be through-apertures, but could constitute blind-bores in he capsule wall to achieve a similar reduction in the thermal conductivity of the capsule.

While a preferred manner of achieving the advantages of the present invention has been illustrated and described, modifications thereof will occur to those skilled in the art. It is therefore intended that the invenion is to be limited only by the scope of the appended claims.

We claim:
1. A dental ingredient containing capsule that is adapted to be placed in a mixing machine of the type that sprays a coolant fluid thereat, comprising;
   (a) a body section,
   (b) a mating cover section, and
   (c) means on a portion of said sections and extending longitudinally thereof to increase the thermal conductivity of said portion relative to the remaining portions of said sections.
2. The capsule according to claim 1, further comprising;
   (d) an inner metallic capsule located within said body and cover sections.
3. The capsule according to claim 2, wherein;
said means comprises a flat surface extending from end to end of an otherwise cylindrical capsule, defining an extremely thin-walled portion of said body and cover sections.
4. The capsule according to claim 2, wherein;
said means comprises a plurality of longitudinally extending bores on said body section.
5. The capsule according to claim 4, wherein;
said bores are through-bores placing the interior of said body section in communication with the exterior thereof and the exterior surface of said inner metallic capsule.
6. The capsule according to claim 1, wherein;
said means comprises a flat surface extending between the ends of an otherwise cylindrical capsule defining a longitudinally extending thin-walled portion of said body and cover sections.
7. The capsule according to claim 1, wherein;
said means comprises a plurality of longitudinally extending bores on said body section.
8. The capsule according to claim 1, wherein;
said cover and body sections comprise generally cylindrical members having convex ends, and
said means comprises a flat side wall extending longitudinally from one convex end to the other.
9. The capsule according to claim 1, further comprising;
   (d) a thin-walled inner metallic capsule located within said body and cover sections conforming to the interior of said body section and having an edge that extends into said cover section.
10. The capsule according to claim 9, wherein;
   (e) said body and cover sections are fabricated from a plastic material.

References Cited
UNITED STATES PATENTS

| | | | |
|---|---|---|---|
| 2,167,344 | 7/1939 | Corr | 165—134 |
| 2,876,634 | 3/1959 | Zimmerman et al. | 62—530 |
| 3,139,181 | 6/1964 | Kobernick | 206—63.5 |
| 3,344,914 | 10/1967 | Bloom et al. | 206—63.5 |

ROBERT A. O'LEARY, Primary Examiner

CHARLES SUKAL, Assistant Examiner

U.S. Cl. X.R.
206—63.5; 259—72